No. 791,625. PATENTED JUNE 6, 1905.
F. L. JOUBERT.
LUMBER WAGON.
APPLICATION FILED DEC. 6, 1904.
2 SHEETS—SHEET 1.
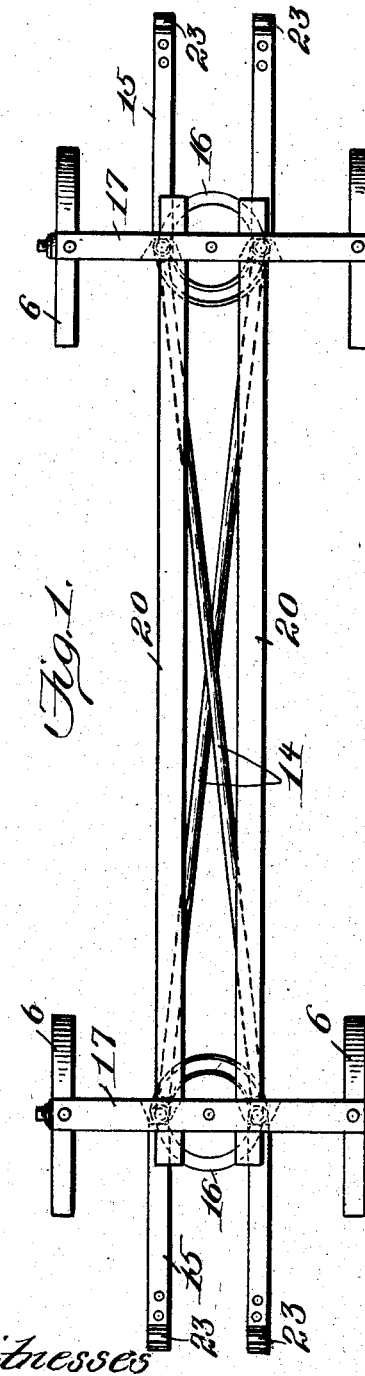
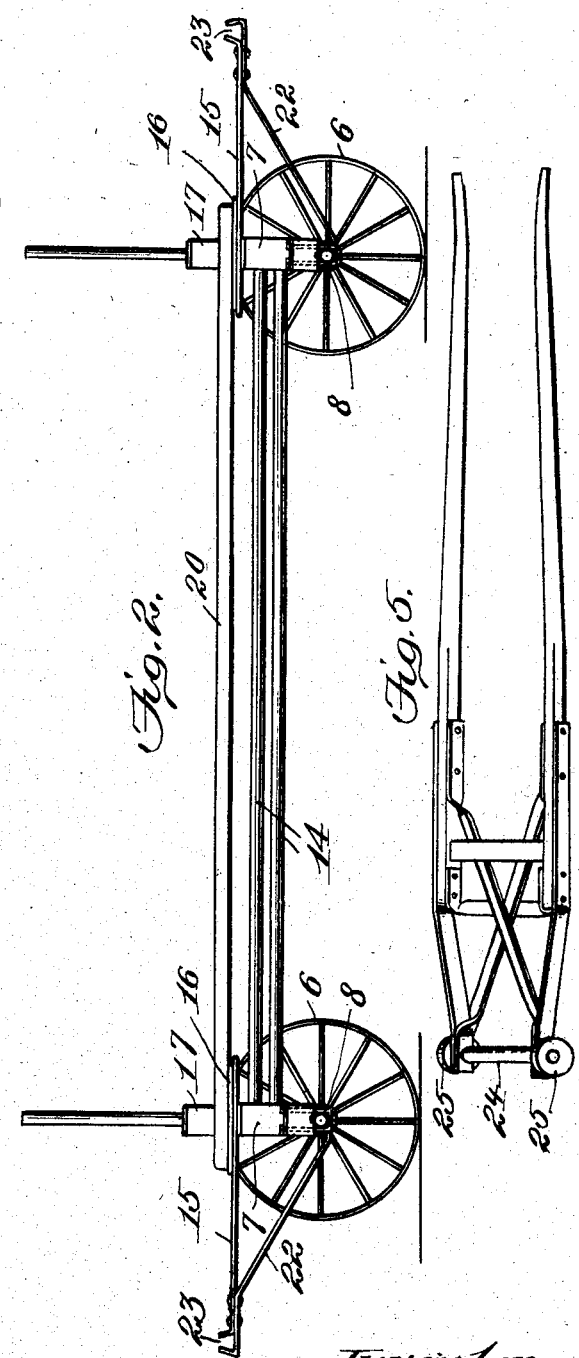
Witnesses
Inventor
Frederic L. Joubert No. 791,625. PATENTED JUNE 6, 1905.
F. L. JOUBERT.
LUMBER WAGON.
APPLICATION FILED DEC. 6, 1904.
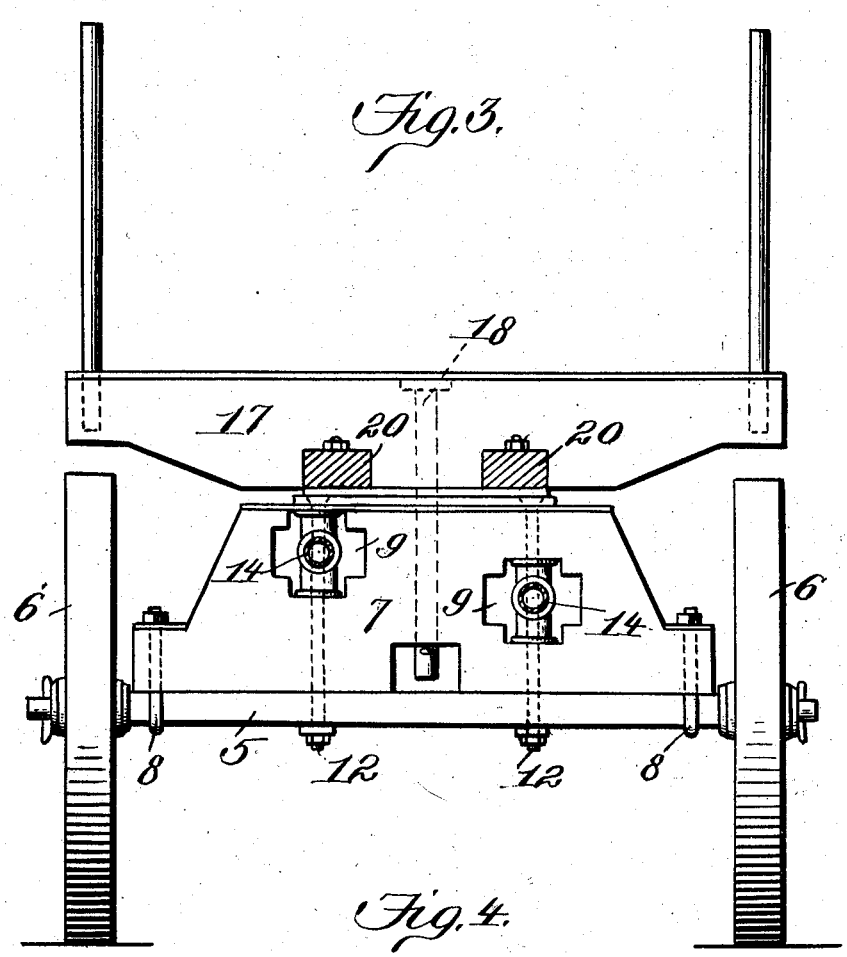
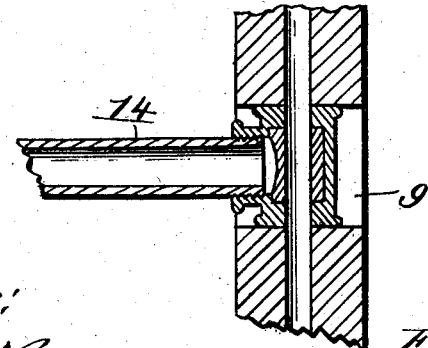

No. 791,625.

Patented June 6, 1905.

UNITED STATES PATENT OFFICE.

FREDERIC L. JOUBERT, OF NEW ORLEANS, LOUISIANA, ASSIGNOR TO PAYNE & JOUBERT, OF NEW ORLEANS, LOUISIANA, A FIRM.

LUMBER-WAGON.

SPECIFICATION forming part of Letters Patent No. 791,625, dated June 6, 1905.

Application filed December 6, 1904. Serial No. 235,686.

*To all whom it may concern:*

Be it known that I, FREDERIC L. JOUBERT, a citizen of the United States of America, residing at New Orleans, in the parish of Orleans and State of Louisiana, have invented certain new and useful Improvements in Lumber-Wagons, of which the following is a specification.

This invention relates to lumber-wagons or, as they are sometimes called, "mule-dollies" for use primarily in moving lumber from place to place in a mill, the object of the invention being to provide a thoroughly strong yet relatively simple and light vehicle of this class which in operation is thoroughly effective for the use to which it is put.

While I have termed the vehicle as a "lumber-wagon," it is obvious that the same may be used with equal advantage for other purposes, from which it will be apparent that a vehicle embodying the invention is not restricted to any particular use.

In the drawings accompanying and forming part of this specification there is illustrated one convenient adaptation of the invention, which will be fully set forth in the following description. The invention, however, is not limited to the disclosure thus made, for certain variations may be adopted within the scope of the claims succeeding said description.

Referring to the drawings, Figure 1 is a plan view of a vehicle including the invention. Fig. 2 is a side elevation of the same. Fig. 3 is a transverse sectional elevation. Fig. 4 is a vertical sectional detail hereinafter more particularly described. Fig. 5 is a view of the shaft.

Like numerals refer to like parts throughout the several views.

The vehicle illustrated in the accompanying drawings consists of a top frame, preferably made of wood, comprising two end bunks 17, parallel to each other, rigidly connected to each other by one or two reaches 20, said bunks having centrally pivoted to same the end trucks by means of king-bolts 18, all as shown in Figs. 1, 2, and 3, said frame also being provided with metal fifth-wheels 16, rigidly connected to same by means of bolts or otherwise, said fifth-wheels resting directly on member 15, forming part of end trucks to be hereinafter described. This frame, as above described, forms in reality the body of a vehicle which may, according to the use intended, be furnished with sides and a bottom, as might be required for use in conveying loose matter—such as sand, bricks, and the like—Figs. 1, 2, and 3 showing a frame constructed, preferably, for loading lumber. It is obvious that the wearing parts of said frame may be lined or protected with band-iron or otherwise.

Having described the construction of the body of the wagon, it is now intended to describe the construction of the end trucks and the relation which they bear to each other and to the body of the wagon. The end trucks include in their construction an axle (designated by 5) provided at opposite ends with running-wheels, as 6, associated with each respective axle in any desirable or convenient way. Each axle supports a block, as 7, and the axles and their coöperating blocks may be connected in any desirable way—for example, by means of U-bolts 8.

A supporting-block 7 will now be fully described, and such description will apply to the other block. The block 7 has at opposite sides of its center (see, for example, Fig. 3) slots, each denoted by 9 and represented as being approximately of cruciform shape. The slot 9 at the left in Fig. 3 is shown as being higher than the other slot for a purpose that will hereinafter appear. These slots are intended to allow the connecting ends of cross-rods 14, which are of equal length, to connect directly to bolts 12 and to provide also for the lateral motion of same. Bolts 12, which extend vertically, passing through bores in the blocks 7 and alined with respective slots 9, serve as pivots for the cross-rods 14 and in addition perform the function of holding the blocks or bolster 7 in rigid relation with the axles 5 and fork 15. Referring again to Fig. 3, it is obvious that the cross-rods 14, which are shown as tubular, may be constructed differently, the object of same being only to provide a rigid cross connection pivoted to the trucks at each end of the wagon, bolts 12 forming pivots being in the same plane and parallel to central pivot or king-bolts 18 in line and equidistant on opposite sides. Said end trucks are so connected and pivoted that when one is turned the other simultaneously assumes the same opposite respective angle, and consequently both trucks follow the same circular path when the wagon is moved, the object of the invention being to construct a wagon that will turn in the shortest radius and provide also that the hind wheels will clear any obstruction which has been cleared by the front wheels, since they follow the same path, for example, going around a post.

Further describing my invention, upon the tops of the two blocks 7 rest the inner bent portion of U-shaped member 15, the parallel branches of said U-shaped members extending outward from the respective blocks, while the inner or U-shaped portions thereof rest, as stated, on the blocks or bolsters 7 and constitute the under halves or sections of fifth-wheels and are held to bolsters 7 by bolts 12, having heads countersunk in the inner portion. As will be apparent, these U-shaped members constitute a combined fifth-wheel and hitching-arm. The bolts 12 therefore serve a double function. They not only serve to secure rigidly together the U-shaped members, the bolsters 7, and the axle 5, but act as pivots for the cross-rods 14. By reason of the form of the slots 9, hereinbefore described, free lateral motion of the connecting-rods or cross-arms 14 is permitted as the trucks are turned.

As previously indicated, the inner portions of the U-shaped members serve as the under sections or halves of fifth-wheels, the upper sections of said fifth-wheels being denoted by 16 and being in form of rings secured to the upper frame or body of the vehicle. These rings 16 are rigidly united to the under side of the two cross-pieces or arms 17 in any desirable way, and from this it will be apparent that the lower fifth-wheel sections can freely turn upon the upper fifth-wheel sections, rings, or bearings 16 as the trucks are swung around. The pivots for the fifth-wheels are denoted by 18 and are shown as king-bolts extending freely through alined bores in the respective cross-pieces 17 and blocks 7.

To the outer ends of parallel arms of U-shaped members 15 are connected the corresponding ends of braces 22, the respective ends of each member being bent to form the taper slot 23, which provides a simple means of instantly hitching or unhitching the shaft, which I will here describe.

Independent of the lumber-wagon heretofore described there is a hitching-shaft, as shown in Fig. 5, provided with a cross-bar, preferably round, 24, which fits with a slight play in the taper slots 23. The slots have a slight taper to the sides for reasons which will further appear. It is apparent that to hitch the shaft to the wagon it is only necessary to drop the cross-bar 24 in the slots 23, the slight taper of the slots and weight of the shaft and cross-bar being sufficient to keep the cross-bar from slipping out. It is apparent that the shaft can be disconnected from the wagon as quickly as it is connected. The shaft besides having a cross-bar 24 has on each end of the cross-bar a small wheel 25, so that when the shaft is disconnected it will roll on the ground instead of dragging.

Referring back to the construction of the wagon, it will be seen that both ends are alike, having extended U-shaped members forming, in combination with braces 22, slots 23 for hitching the shaft by means of cross-bar 24. It is therefore apparent that the shaft can be hitched to either end of the wagon, obviating the necessity of turning around.

Having thus described the invention, what is claimed as new, and desired to be secured by Letters Patent, is—

1. In a vehicle, trucks having a U-shaped member forming a combination of fifth-wheel with extending arms rigidly connected to braces with ends forming a hitching-slot, substantially as described and for the purpose set forth.

2. In a vehicle, an approximately U-shaped member forming part of the truck or trucks, the inner or U-shaped portion constituting a fifth-wheel section with outwardly-extending arms connected to braces forming hitching-slots, substantially as described and for the purpose set forth.

3. In a vehicle, an independent hitching-shaft having a cross-bar on the end fitting as described into hitching-slots forming part of said vehicle, said cross-bar being provided with wheels on its ends for the purpose as described.

In testimony whereof I affix my signature in presence of two witnesses.

FREDERIC L. JOUBERT.

Witnesses:
   W. E. PAYNE,
   W. H. COOK.